US012786600B2

(12) United States Patent
Rathinasamy et al.

(10) Patent No.: US 12,786,600 B2
(45) Date of Patent: Nov. 3, 2026

(54) MANAGING NETWORK CONGESTION USING AN OPTICAL LINK

(71) Applicant: Dell Products L.P., Round Rock, TX (US)

(72) Inventors: Shree Rathinasamy, Round Rock, TX (US); Maxim Balin, Gan-Yavne (IL); Joshua David Anderson, Round Rock, TX (US)

(73) Assignee: Dell Products L.P., Round Rock, TX (US)

( * ) Notice: Subject to any disclaimer, the term of this patent is extended or adjusted under 35 U.S.C. 154(b) by 271 days.

(21) Appl. No.: 18/647,328

(22) Filed: Apr. 26, 2024

(65) Prior Publication Data

US 2025/0338047 A1 Oct. 30, 2025

(51) Int. Cl.
*H04Q 11/00* (2006.01)
*H04J 14/02* (2006.01)

(52) U.S. Cl.
CPC ..... *H04Q 11/0066* (2013.01); *H04Q 11/0005* (2013.01); *H04J 14/0271* (2013.01); *H04Q 2011/0083* (2013.01)

(58) Field of Classification Search
None
See application file for complete search history.

(56) References Cited

U.S. PATENT DOCUMENTS

| | | | | |
|---|---|---|---|---|
| 9,641,397 | B2 * | 5/2017 | Suzuki | H04L 41/0816 |
| 9,906,294 | B2 * | 2/2018 | Al Sayeed | H04J 14/0268 |
| 9,912,521 | B2 * | 3/2018 | Uppalapati | H04L 41/40 |
| 9,935,882 | B2 * | 4/2018 | Baveja | H04L 67/1001 |
| 10,454,583 | B2 * | 10/2019 | Mehrvar | H04B 10/07953 |
| 2002/0191247 | A1 * | 12/2002 | Lu | H04J 14/0228 398/79 |
| 2015/0256407 | A1 * | 9/2015 | Iizawa | H04L 41/044 370/254 |
| 2022/0368625 | A1 * | 11/2022 | Smith | H04L 45/24 |
| 2024/0430203 | A1 * | 12/2024 | Smith | H04L 47/17 |
| 2025/0219951 | A1 * | 7/2025 | Gupta | H04L 47/6215 |

OTHER PUBLICATIONS

Vacca, John R., Optical Networking Best Practices Handbook, John Wiley & Sons, Inc., 2007 (Year: 2007).*

* cited by examiner

*Primary Examiner* — Jai M Lee
(74) *Attorney, Agent, or Firm* — WOMBLE BOND DICKINSON (US) LLP

(57) ABSTRACT

Methods and systems for operation of an endpoint device of a deployment are disclosed. The endpoint device may obtain a network data united directed to a destination. The endpoint device may select a channel over which to forward the network data united based on a forwarding policy and a state of an optical link between the endpoint device and an optical service point. The forwarding policy may be keyed, at least in part, on the state of the optical link. The endpoint device may forward the network data unit over the selected channel to direct the network data unit towards the destination in order to facilitate provisioning of desired computer-implemented services.

20 Claims, 7 Drawing Sheets

MANAGING NETWORK CONGESTION USING AN OPTICAL LINK

FIELD

Embodiments disclosed herein relate generally to device management. More particularly, embodiments disclosed herein relate to systems and methods to manage endpoint devices of a deployment.

BACKGROUND

Computing devices may provide computer-implemented services. The computer-implemented services may be used by users of the computing devices and/or devices operably connected to the computing devices. The computer-implemented services may be performed with hardware components such as processors, memory modules, storage devices, and communication devices. The operation of these components, and hosted entities such applications, may impact the performance of the computer-implemented services.

BRIEF DESCRIPTION OF THE DRAWINGS

Embodiments disclosed herein are illustrated by way of example and not limitation in the figures of the accompanying drawings in which like references indicate similar elements.

DETAILED DESCRIPTION

Figure 1A:
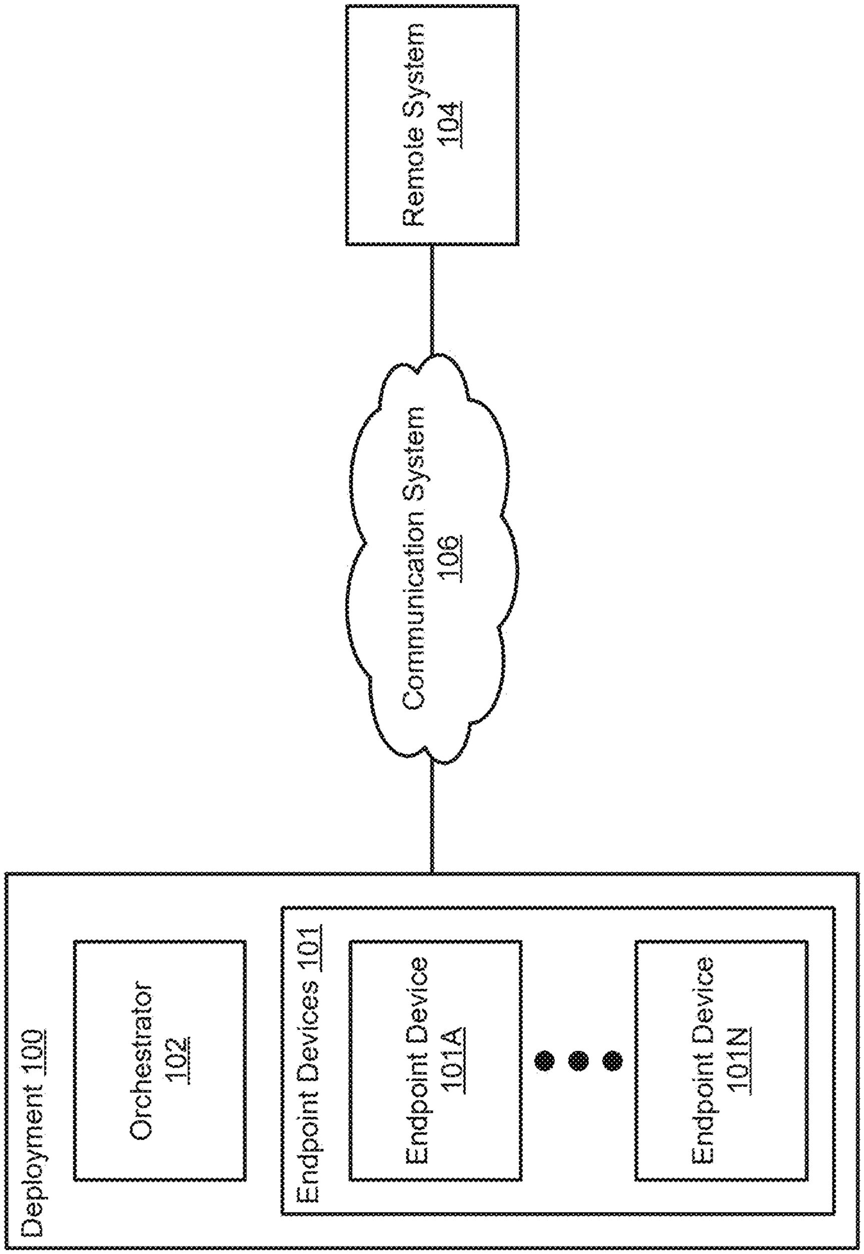
FIG. 1A shows a block diagram illustrating a system in accordance with an embodiment.

Various embodiments will be described with reference to details discussed below, and the accompanying drawings will illustrate the various embodiments. The following description and drawings are illustrative and are not to be construed as limiting. Numerous specific details are described to provide a thorough understanding of various embodiments. However, in certain instances, well-known or conventional details are not described in order to provide a concise discussion of embodiments disclosed herein.

Reference in the specification to "one embodiment" or "an embodiment" means that a particular feature, structure, or characteristic described in conjunction with the embodiment can be included in at least one embodiment. The appearances of the phrases "in one embodiment" and "an embodiment" in various places in the specification do not necessarily all refer to the same embodiment.

References to an "operable connection" or "operably connected" means that a particular device is able to communicate with one or more other devices. The devices themselves may be directly connected to one another or may be indirectly connected to one another through any number of intermediary devices, such as in a network topology.

In general, embodiments disclosed herein relate to methods and systems for managing operation of endpoint devices of a deployment. To provide services using the endpoint devices, the endpoint devices may be connected to a network through which the endpoint devices may communicate with one another and/or with other devices connected to the network. For example, the network topology may include a tiered network architecture, and during operation, the endpoint devices may generate and/or forward data packets to one another and ultimately to an uplink gateway in order to provide computer-implemented services. The tiered network architecture may be implemented for scalability, flexibility, security, and/or for other reasons.

However, endpoint devices of a tiered network architecture may be subject to certain data transfer limitations (e.g., connectivity, bandwidth restrictions, and/or other network constraints) that may make the endpoint devices susceptible to network congestion and bottlenecks. For example, endpoint devices of some tiers may generate and/or forward higher volumes of data than endpoint devices of other tiers, resulting in bandwidth availability issues in high data volume tiers, especially at the topmost endpoint device of the tier (e.g., the endpoint device that may be directly connected to the uplink gateway). These limitations may lead to reductions in network service quality, increases in numbers of dropped and/or resent data packets, underutilized network links, etc., which may reduce an ability of the deployment to provide desired computer-implemented services.

To increase the likelihood of providing the desired computer-implemented services, portions of data forwarding may be offloaded to secondary connections when network congestion levels of a primary connections reach specified thresholds. The portions of data may be forwarded using light communication via a number of optical service points of the network (e.g., over a light fidelity (Li-Fi) connection) in accordance with a (data) forwarding policy for the deployment in order to reduce network data traffic of the primary connection (e.g., a wired or wireless fidelity (Wi-Fi) connection).

By doing so, an aggregate bandwidth of the deployment may be increased, which may reduce network congestion and/or impacts thereof.

Thus, embodiments disclosed herein may address, among others, the technical problem of network congestion in tiered network topology architectures. By implementing adaptive routing paths for network data based on network congestion levels and a forwarding policy, the deployment may be more likely to provide the desired computer-implemented services.

In an embodiment, a method for operation of an endpoint device of a deployment is provided. The method may include: obtaining, by the endpoint device, a network data unit directed to a destination; selecting, by the endpoint device, a channel over which to forward the network data unit, the channel being selected based on a forwarding policy and a state of an optical link between the endpoint device and an optical service point, and the forwarding policy being keyed, at least in part, to the state of the optical link; and, forwarding, by the endpoint device, the network data unit over the selected channel to direct the network data unit towards the destination to facilitate provisioning of desired computer-implemented services.

The method may also include, prior to obtaining the network data unit: analyzing, by the endpoint device, network data unit traffic to obtain a congestion report; and, providing, by the endpoint device, the congestion report to an edge orchestrator for the deployment to facilitate identification of a congestion level of the network data unit traffic in the deployment. The congestion report may be provided to the edge orchestrator via the optical link or a primary network channel, the primary network channel including a radio frequency link.

The method may further include, prior to obtaining the network data unit, making an identification that the state of the optical link changed from an inactive state and to an active state after the congestion report is provided to the edge orchestrator.

The forwarding policy may have forbidden use of the optical link for network data unit forwarding purposes prior to the state of the optical link changing to the active state. After the state of the optical link changes to the active state, the forwarding policy may enable use of the optical link for network data unit forwarding purposes, and an aggregate bandwidth of the endpoint devices for network data forwarding purposes may be increased by the optical link while the optical link is in the active state.

The forwarding policy may be further keyed to: congestion levels of other endpoint devices of the deployment; prioritization goals; and, network data unit origination location. The forwarding policy may be adapted to establish a prescribed routing path for network data units forwarded in the deployment while the optical link is in an inactive state, and may establish an adaptive routing path for the network data units forwarded in the deployment while the optical link is in an active state.

In an embodiment, a non-transitory media is provided. The non-transitory media may include instructions that when executed by a processor cause the computer-implemented method to be performed.

In an embodiment, a data processing system is provided. The data processing system may include the non-transitory media and a processor, and may perform the method when the computer instructions are executed by the processor.

Turning to FIG. 1A, a block diagram illustrating a system in accordance with an embodiment is shown. The system shown in FIG. 1A may provide computer-implemented services. The computer-implemented services may include any type and quantity of computer-implemented services. For example, the computer-implemented services may include data storage services, instant messaging services, database services, and/or any other type of service that may be implemented with a computing device.

To provide the computer-implemented services, any number of data processing systems (e.g., endpoint devices) may be deployed to a deployment. The endpoint devices may cooperatively provide the computer-implemented services.

To provide the computer-implemented services, the system may include deployment 100. Deployment 100 may include any number of endpoint devices 101 (e.g., 101A-101N). Any of endpoint devices 101 may cooperatively and/or individually provide all, or a portion of the computer-implemented services.

To contribute to the computer-implemented services, endpoint devices 101 may host certain software, may be configured in certain manners (e.g., network communication configurations, software/hardware configurations, etc.), and/or may otherwise be modified to meet one or more requirements to contribute to the computer-implemented services. Further, groups of endpoint devices 101 may be modified to cooperatively provide various services. For example, some endpoint devices of a group may host some software to provide some functions while other endpoint devices of a group may host different software to provide other functions which, in aggregate, allow desired computer-implemented services to be provided.

Endpoint devices 101 may be connected to one another (and to other devices) via any number of networks in order to facilitate data transfer between endpoint devices 101. For example, the networks may include wired and/or wireless (e.g., Wi-Fi) networks. Each and/or any of endpoint devices 101 may generate data, which may be provided to an uplink gateway (e.g., a network switch) in order to provide the desired computer-implemented services.

For example, endpoint devices 101 may be organized in a tiered manner, and data generated by endpoint devices of each tier may be forwarded to, via links to other endpoint devices of the tier, the top-most endpoint device of the tier, which may be directly connected to the uplink gateway. Some groups (e.g., network tiers) of endpoint devices 101 may generate higher volumes of data than others (e.g., depending on their function), and therefore may be required to transfer higher volumes of data to the uplink gateway.

However, due to bandwidth restrictions and/or connectivity limitations of the tiered network architecture, the network may become congested when network data traffic exceeds an available bandwidth. For example, some endpoint devices and/or network links of a high-volume data tier may experience levels of incoming network data traffic that exceed outgoing bandwidth, creating bottlenecks in data transfer to the uplink gateway, while network links of low-volume data tiers may be underutilized. Network congestion (e.g., bottlenecks) may result in data loss (e.g., dropped data packets), poor network performance (e.g., slow data transfer), and/or other negative impacts to the network (e.g., network collapse), which may prevent deployment 100 from providing the desired computer-implemented services.

In general, embodiments disclosed herein may provide methods, systems, and/or devices for managing the operation of endpoint devices of a deployment such that the deployment may be more likely to provide the desired computer-implemented services. To manage the operation of the endpoint devices, a forwarding policy for endpoint devices (and/or other types of devices) of the deployment may be enforced. The forwarding policy may enable use of an optical link for network data forwarding purposes during times of network congestion in order to increase an aggregate bandwidth of the endpoint devices.

For example, based on network congestion levels of endpoint devices of the deployment, an adaptive routing path for network data forwarded in the deployment may be established. The adaptive routing path may include offloading portions of network data traffic to the optical link (e.g., over optical channels such as Li-Fi or other free space optical communication protocols), and/or to previously unused network links (e.g., cross-tier links to peer endpoint devices). Refer to the discussion of FIG. 1B for additional details regarding free space optical communication interfaces.

By doing so, embodiments disclosed herein may improve the network performance of the deployment by increasing bandwidth (e.g., aggregate bandwidth) of the network during times of network congestion. The system may do so by dynamically by activating and/or deactivating the optical link in accordance with the forwarding policy based on monitored levels of network congestion.

To provide the above noted functionality, the system of FIG. 1A may include deployment 100, orchestrator 102, remote system 104, and communication system 106. Each of these components is discussed below.

Orchestrator 102 (e.g., an edge orchestrator) may manage deployment 100. To manage deployment 100, orchestrator 102 may allow privileged users (e.g., administrators, etc.) to define parameters of the forwarding policy, for example, by configuring settings (e.g., congestion level thresholds, data priorities, and/or other parameters) that may trigger and/or manage offloading of network data traffic during enforcement of the forwarding policy.

To ensure operation of endpoint devices 101 in accordance with the forwarding policy, orchestrator 102 may obtain information such as congestion reports from endpoint devices 101. The congestion reports may be used to identify congestion levels of the network. Based on the congestion levels (and/or other factors), orchestrator 102 may perform actions in accordance with the forwarding policy. For example, orchestrator 102 may enable use of (e.g., activate) an optical link for data forwarding when pre-determined congestion levels are reached for the network.

Deployment 100, as noted above, may provide computer-implemented services. To provide the computer-implemented services, endpoint devices 101 of deployment 100 may operate in accordance with the forwarding policy discussed above. To do so, an endpoint device of endpoint devices 101 may (i) participate in network data traffic monitoring (e.g., by analyzing incoming network data traffic and providing congestion reports to orchestrator 102, refer to FIG. 2A), (ii) obtain a network data unit (e.g., a data packet) directed to a destination, (iii) select a channel over which to forward the data packet (e.g., in accordance with the forwarding policy), and/or (iv) forward the network data unit over the selected channel. For example, the selected channel may include a primary network channel (e.g., an Ethernet or Wi-Fi channel) or a secondary network channel (e.g., a Li-Fi channel), depending on the congestion levels of the network (e.g., of the endpoint and/or other endpoint devices of the same tier). Refer to the discussion of FIG. 2B for more information regarding data forwarding in accordance with a forwarding policy.

The forwarded network data unit may be forwarded over the selected channel towards the destination. For example, the destination may include an uplink gateway and/or a remote system (e.g., remote system 104).

Remote system 104 may consume computer-implemented services provided by deployment 100 (e.g., remote system 104 may be a downstream consumer of data generated by deployment 100) and/or may provide computer-implemented services using data obtained from deployment 100 (e.g., remote system 104 may be associated with a data center). For example, data generated by endpoint devices 101 of deployment 100 may be forwarded to an uplink gateway (e.g., a network switch) that may direct portions of the data to remote system 104.

Figure 2A:
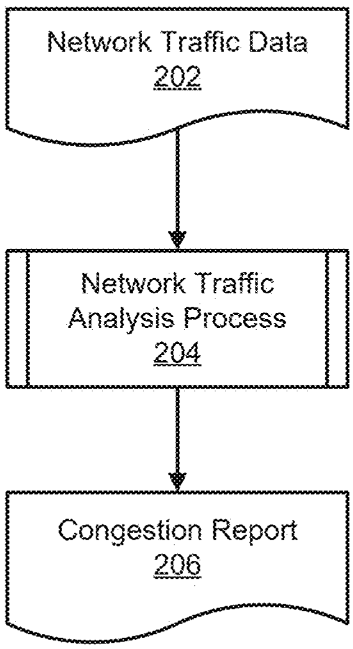
FIGS. 2A-2B show data flow diagrams in accordance with an embodiment.
Figure 2B:
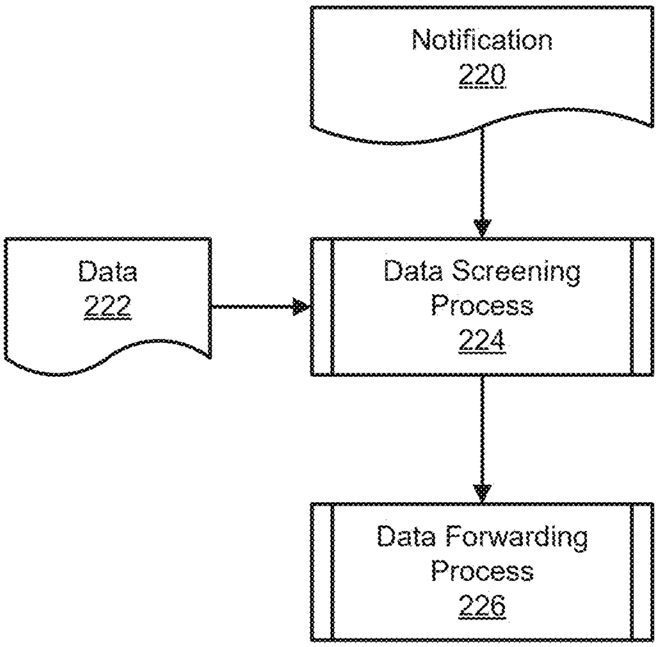
Figure 3:
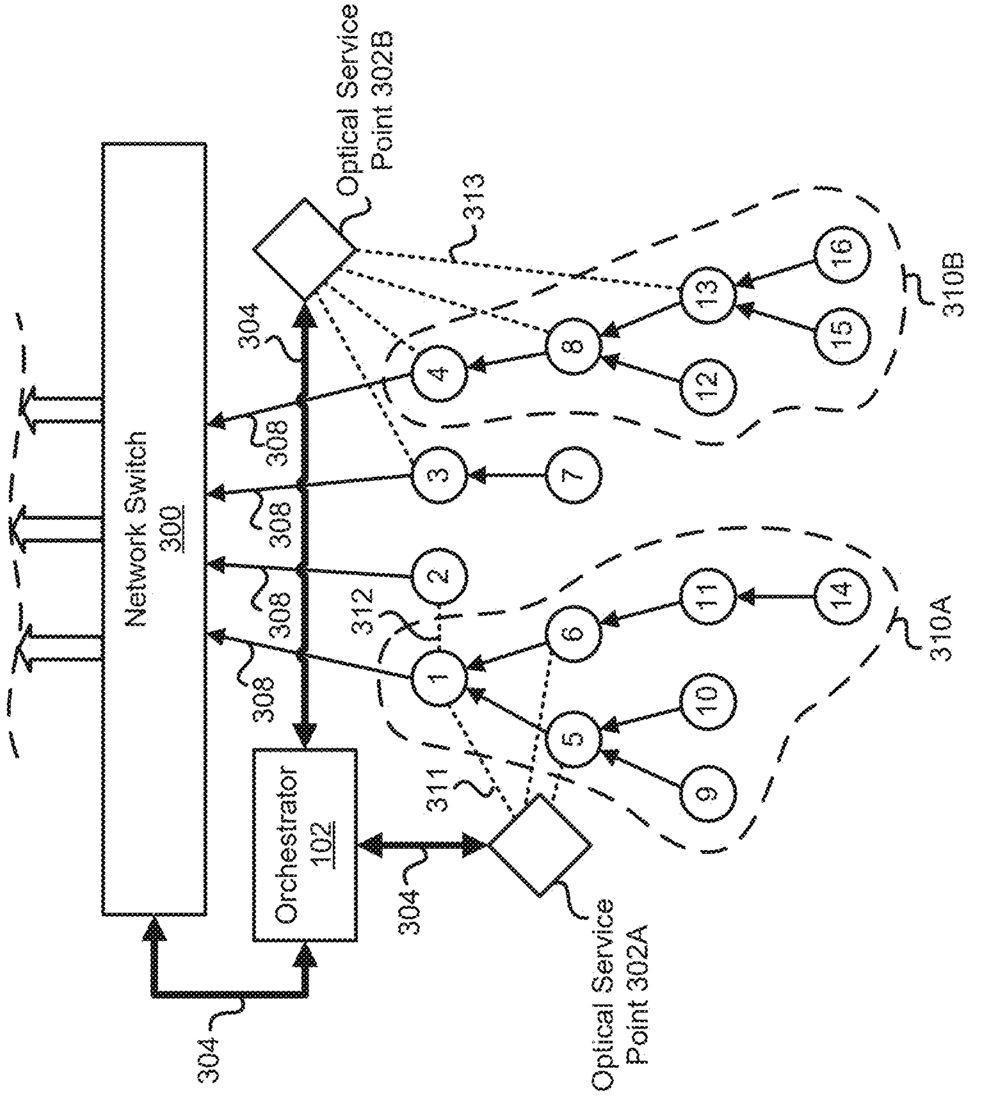
FIG. 3 shows an example of a deployment of endpoint devices in accordance with an embodiment.

When providing their functionality, any of (and/or components thereof) deployment 100, orchestrator 102, and/or remote system 104 may perform all, or a portion, of the actions and methods illustrated in FIGS. 2A-3.

Any of (and/or components thereof) deployment 100, orchestrator 102, and remote system 104 may be implemented using a computing device (also referred to as a data processing system) such as a host or a server, a personal computer (e.g., desktops, laptops, and tablets), a "thin" client, a personal digital assistant (PDA), a Web enabled appliance, a mobile phone (e.g., Smartphone), an embedded system, local controllers, an edge node, and/or any other type of data processing device or system. For additional details regarding computing devices, refer to the discussion of FIG. 5.

Any of the components illustrated in FIG. 1A may be operably connected to each other (and/or components not illustrated) with communication system 106. In an embodiment, communication system 106 includes one or more networks that facilitate communication between any number of components. The networks may include wired networks and/or wireless networks (e.g., and/or the Internet). For example, the wireless networks may use optical wireless communication technology (e.g., Li-Fi) and/or radio frequency communication technology (e.g., Wi-Fi). The networks may operate in accordance with any number and types of communication protocols (e.g., such as the internet protocol).

While illustrated in FIG. 1A as including a limited number of specific components, a system in accordance with an embodiment may include fewer, additional, and/or different components than those illustrated therein.

To facilitate communications between endpoint devices 101 (and other devices), each endpoint device of endpoint devices 101 may include communication interfaces. At least one communication interface may be a free space optical communication interface.

Figure 1B:
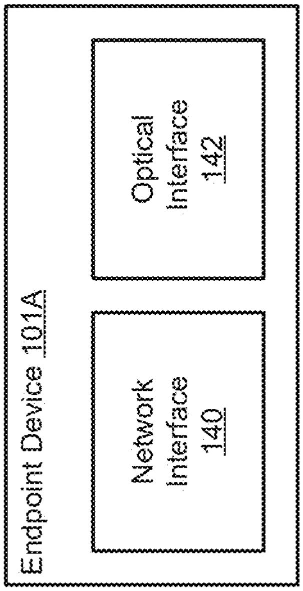
FIG. 1B shows a block diagram illustrating an endpoint device of a system in accordance with an embodiment.

Turning to FIG. 1B, a diagram of an endpoint device in accordance with an embodiment is shown. Endpoint device 101A may be similar to any of endpoint devices 101 shown in FIG. 1A.

As discussed above, endpoint device 101A may provide computer-implemented services. To provide the computer-implemented services, endpoint device 101A may communicate with other devices, such as other endpoint devices, orchestrators, etc.

To communicate with other devices, endpoint device 101A may include network interface 140 and optical interface 142. Network interface 140 may facilitate network communications with other devices (e.g., via communication system 106). Network interface 140 may be implemented with a network interface card or other devices that facilitate wired and/or wireless (e.g., using radio frequency and/or higher frequency bands up to 100 gigahertz) network communications.

Like network interface 140, optical interface 142 may also facilitate communications with other devices. However, optical interface 142 may utilize optical transmission mediums (e.g., free space) and optical signals to exchange information with other devices. Optical interface 142 may include an optical transceiver or other types of systems for generating optical signals and interpreting received optical signals. For example, the optical transceiver may generate modulated optical signals to carry data, and may facilitate interpretation of received optical signals to receive data.

To communicate with other devices connected to a network, endpoint device 101A may transmit optical signals via optical interface 142 to one or more optical service points (not shown). The optical service points may also include optical transceivers (or other types of systems) for receiving the optical signals, and may be connected to the network via wired (or wireless) means. Refer to the discussion of FIG. 3 for more information regarding transmission of optical signals to optical service points.

To further clarify embodiments disclosed herein, data flow diagrams in accordance with an embodiment are shown in FIGS. 2A-2B. In these diagrams, flows of data and processing of data are illustrated using different sets of shapes. A first set of shapes (e.g., 202, 206, etc.) is used to represent data structures, and a second set of shapes (e.g., 204, 224, etc.) is used to represent processes performed using and/or that generate data.

Turning to FIG. 2A, a first data flow diagram in accordance with an embodiment is shown. The first data flow diagram may illustrate data used in and data processing performed when an endpoint device of a deployment participates in network data traffic monitoring.

To participate in network data traffic monitoring, the endpoint device may perform network traffic analysis process 204. To perform network traffic analysis process 204, the endpoint device may obtain network traffic data 202. Network traffic data 202 may include data related to network activity over periods of time. For example, network traffic data 202 may include amounts of incoming and outgoing network traffic for interfaces of the endpoint device (e.g., bandwidth data), data packet processing speeds, data packet queue depth, numbers of dropped and/or resent data packets, and/or other data related to network traffic over the periods of time.

Network traffic data 202 may be obtained using a variety of network traffic monitoring tools. For example, the tools may allow monitoring of network activity at the interface level, at the endpoint device level, and/or at other levels of the network. To collect network traffic data 202, various software applications may be installed and/or running on the endpoint device that may log network activity information over time. Network traffic may be monitored for various purposes. For example, network traffic may reveal general network health, network security issues, processes related to high volumes of network traffic, and/or network congestion issues.

During network traffic analysis process 204, the endpoint device may analyze network traffic data 202 in order to obtain network traffic reports, such as congestion report 206. For example, the endpoint device may determine, based on network traffic data 202 and a number of thresholds associated with information included in network traffic data 202, whether there is a network bottleneck associated with the endpoint device. The thresholds may include, for example, maximum numbers of dropped packets per time period, maximum queue depth per time period, and/or other types of thresholds for measuring network congestion based on network traffic data 202. The analysis of network traffic data 202 may be used to obtain congestion report 206.

Congestion report 206 may include information regarding the endpoint device (e.g., device and/or component identifiers, interface bandwidth capacity information), portions of network traffic data 202, results of the analysis of network traffic data 202, and/or other data. Congestion report 206 may be provided to a portion of a control plane of the network, such as an orchestrator. For example, congestion report 206 may be provided to the orchestrator via any or all transmission mediums allowed by the network (e.g., over Li-Fi, W-Fi, and/or Ethernet connections). Network traffic data and/or congestion reports may be obtained, consolidated and/or monitored by an entity managing the deployment (e.g., via a console and/or an automated process).

The orchestrator may use congestion report 206 along with other data (e.g., congestion reports from other endpoint devices of the deployment, network activity collected at other levels of the network) to identify congestion levels of the network.

Thus, using the data flows shown in FIG. 2A endpoint devices of a deployment may analyze and report network traffic information to a control plane (e.g., an orchestrator) of the network, so that congestion levels of the network may be identified. Based on the identified congestion levels, the control plane (e.g., the orchestrator) may initiate and/or perform actions to manage changes in network congestion in accordance with a forwarding policy. For example, when congestion levels surpass an acceptable level (e.g., reach an unacceptable level, based on a threshold), an optical link of the network may be activated to allow offloading of data for portions of endpoint devices of the deployment.

Turning to FIG. 2B, a second data flow diagram in accordance with an embodiment is shown. The second data flow diagram may illustrate data used in and data processing performed when managing data forwarding for an endpoint device of a deployment.

To manage data forwarding for an endpoint device, a forwarding policy may be established for endpoint devices of the deployment. The forwarding policy may specify different data packet routing paths based on a number of factors. For example, the forwarding policy may be keyed to states of communication links of the network, congestion levels of other endpoint devices of the deployment, prioritization goals, data packet origination location, data security classifications, and/or other factors.

The forwarding policy may specify, based on congestion levels of other endpoint devices (e.g., of the network), that additional communication links are to be activated to increase bandwidth for data forwarding (e.g., data offloading) purposes. Endpoint devices associated with unacceptable levels of network congestion may be allowed to offload data via the additional (activated) communication links. For example, unacceptable levels of congestion may trigger activation of an optical link via which the endpoint devices may forward portions of data packets.

In other words, the forwarding policy may establish a prescribed routing path for data packets forwarded in the deployment while an optical link is in an inactive state, and establish an adaptive routing path for the data packets forwarded in the deployment while the optical link is in an active state. Other types of communication links between endpoint devices of the deployment may be activated during times of network congestion, for example, cross-tier links between endpoint devices that were previously inactive may be activated and/or utilized to increase the likelihood of easing the network congestion.

The forwarding policy may also specify prioritization of data packets. For example, some data packets may be prioritized, deprioritized, or blocked for forwarding during times of network congestion. For example, prioritization of forwarding of data packets may be based on a level of contribution of data packets to operational goals of a managing entity of the deployment, and/or data packets from specific endpoint devices may be prioritized.

The forwarding policy may establish routing paths for data packets based on a security classification of the data packet. For example, the forwarding policy may specify that data packets with higher security classifications are to be transmitted over innately higher-security communication links (e.g., Ethernet link), whereas data packets with lower security classifications are to be transmitted over innately lower-security communication links (e.g., optical link).

The endpoint device may forward data in accordance with the forwarding policy. For example, endpoint device may obtain data 222. Data 222 may include a data packet (e.g., a network data unit) and may be directed to a destination that requires the endpoint device to forward data 222. To select a communication link (e.g., communication channel) over which to forward data 222, data screening process 224 may be performed.

Prior to performing data screening process 224, notification 220 may be obtained by the endpoint device. Notification 220 may include information that indicates a state of an optical link of the network. For example, notification 220 may allow the endpoint device to identify that the state of the optical link has changed from an inactive state to an active state (e.g., a state that allows for data transmission from the endpoint device via the optical link).

For example, prior to the state of the optical link changing to the active state, the forwarding policy may have prohibited use of the optical link by the endpoint device for data forwarding purposes. However, the endpoint device may be associated with an unacceptable level of network congestion and the state of the optical link may have changed from inactive to active (e.g., allowing for its use by the endpoint device for data forwarding purposes) after the endpoint device provided a congestion report to an orchestrator of the deployment.

Returning to data screening process 224, the endpoint may obtain characteristics (e.g., from the packet header) of data 222 in order to select a forwarding channel. The characteristics may include a data type, a data origination location (e.g., an identifier for endpoint device that generated data 222), a priority level, a security classification, a destination (e.g., address), and/or other data characteristics that the forwarding policy may cite.

During data screening process 224, the endpoint may use the characteristics of data 222 to query the forwarding policy in order to establish a routing path for data 222. For example, the forwarding policy may specify that, based on characteristics of data 222, data 222 should be forwarded via an adaptive routing path (e.g., via recently activated optical link). The endpoint device may update (the packet header of) data 222 to reflect the adaptive routing path for data 222 so that data 222 may be forwarded accordingly.

To forward data 222 in accordance with the forwarding policy, the endpoint device may perform data forwarding process 226. During data forwarding process 226, a traffic manager of endpoint device may forward data 222 towards its destination via an optical service point of the optical link using the appropriate interface of the endpoint device (e.g., optical interface 142).

Thus, using the data flows shown in FIG. 2B, data packets may be forwarded by endpoint devices of a deployment in accordance with a forwarding policy. The forwarding policy may be adapted to increase an aggregate bandwidth of the endpoint devices of the deployment during times of reported network congestion. Accordingly, impacts of the network congestion may be reduced, which may increase the likelihood of providing desired computer-implemented services.

Any of the processes illustrated using the second set of shapes may be performed, in part or whole, by digital processors (e.g., central processors, processor cores, etc.) that execute corresponding instructions (e.g., computer code/software). Execution of the instructions may cause the digital processors to initiate performance of the processes. Any portions of the processes may be performed by the digital processors and/or other devices. For example, executing the instructions may cause the digital processors to perform actions that directly contribute to performance of the processes, and/or indirectly contribute to performance of the processes by causing (e.g., initiating) other hardware components to perform actions that directly contribute to the performance of the processes.

Any of the processes illustrated using the second set of shapes may be performed, in part or whole, by special purpose hardware components such as digital signal processors, application specific integrated circuits, programmable gate arrays, graphics processing units, data processing units, and/or other types of hardware components. These special purpose hardware components may include circuitry and/or semiconductor devices adapted to perform the processes. For example, any of the special purpose hardware components may be implemented using complementary metal-oxide semiconductor-based devices (e.g., computer chips).

Any of the data structures illustrated using the first and third set of shapes may be implemented using any type and number of data structures. Additionally, while described as including particular information, it will be appreciated that any of the data structures may include additional, less, and/or different information from that described above. The informational content of any of the data structures may be divided across any number of data structures, may be integrated with other types of information, and/or may be stored in any location.

An example of data forwarding within a deployment of endpoint devices is shown in FIG. 3. Turning to FIG. 3, an example of a deployment of endpoint devices in accordance with an embodiment is shown. In FIG. 3, endpoint devices of the deployment may be indicated by circles 1-16, and prescribed (e.g., normal) flows of data may be indicated by arrows connecting circles 1-16. The endpoint devices indicated by circles 1-16 may be referred to as endpoint devices 1-16.

The endpoint devices may be organized in a tiered fashion. In the example shown, the endpoint devices are organized into two tiers, tier 310A (e.g., including endpoint devices 1, 5, 6, 9, 10, 11, and 14), and tier 310B (e.g., including endpoint devices 4, 8, 12, 13, 15, and 16). The endpoint devices may be organized by tiers based on their functionality, service, time of addition to the deployment, etc.

Any of endpoint devices 1-16 may generate data. The data generated by the endpoint devices may be forwarded via a number of routing paths (e.g., indicated by the arrows) before arriving at network switch 300. Network switch 300 may then, for example, forward portions of the data to their destination (e.g., data centers, downstream consumers).

Endpoint devices 1-4 may be directly connected to network switch 300 via direct connections 308. In the example shown, direct connections 308 and connections between the endpoint devices may include radio frequency links (e.g., Ethernet, Wi-Fi), and may be referred to as primary connections. The primary connections may be used for data forwarding during times of acceptable levels of network congestion (e.g., no network congestion present).

For example, data obtained (e.g., generated) by endpoint device 7 may be forwarded to endpoint device 3 via their primary connection, and data obtained by endpoint device 3 (e.g., including data forwarded by endpoint device 7) may be forwarded to network switch 300 via direct connection 308. Similarly, endpoint device 1 may forward data obtained from endpoint devices 5, 6, 9, 10, 11, and 14, as well as data generated by endpoint device 1, to network switch 300 via direct connection 308. Data forwarding for tier 310B endpoint devices may be performed in a similar fashion.

While operating, any of endpoint devices 1-16 may monitor network traffic by analyzing data packet flow rates, incoming and outgoing packet flow, etc., and may report network congestion to orchestrator 102. For example, any of endpoint devices 1-16 may provide congestion reports to orchestrator 102 using their primary connection paths (e.g., via network switch 300) and/or via other available connection paths (e.g., via optical service points 302A and 302B, if an optical link is available for data transmission). Orchestrator 102 may use the congestion reports and/or other information to identify congestion levels of the network.

Based on the congestion levels and/or other information (e.g., stipulations of a forwarding policy for the deployment), orchestrator 102 may activate a secondary transmission medium and/or secondary connection paths. For example, if congestion levels of the network are unacceptable (e.g., according to a predetermined level of acceptability), then orchestrator 102 may activate an optical link for offloading data forwarding for a portion of the endpoint devices. Orchestrator 102 may activate the optical link by activating a number of optical service points (e.g., 310A, 310B, activated via operable connections 304). In the example shown, operable connections 304 may include Wi-Fi and/or Ethernet connections.

In the example shown, unacceptable levels of network congestion may be associated with endpoint device 3, endpoint devices 1, 5, and 6 of tier 310A, and endpoint devices 4, 8, and 13 of tier 310B ("congested endpoint devices"). The activated optical link may be indicated by dashed lines (e.g., 311, 313) between each of the congested endpoint devices and one of two optical service points (e.g., 302A or 302B).

Any number of optical service points may be activated in order to facilitate optical links between the congested endpoint devices and the optical service points. In the example shown, optical service point 302A may be in a physical location to service endpoint devices of tier 310A (e.g., in a direct line-of-sight to endpoint devices of tier 310A) via operable connections 311, and optical service point 302B may be in a physical location to service endpoint devices of tier 310B, as well as endpoint device 3, via operable connections 313.

The optical service points (e.g., 310A, 310B) may include an optical transceiver, and/or may function similarly to a wireless router. For example, the optical service points may begin to receive transmission signals (e.g., carrying data packets) from a portion of the endpoint devices, and may forward obtained data packets to network switch 300 via operable connection 304.

To further increase available bandwidth for congested endpoint devices, other connection paths may be activated for data forwarding purposes. For example, to further ease network congestion associated with endpoint device 1, operable connection 312 (which may have been previously inactive, or active for communication other than data forwarding) may be activated for use in data forwarding. Endpoint device 1 may use operable connection 312 to offload data to endpoint device 2, whose direct connection 308 to network switch 300 may be underutilized. In the example shown, operable connection 312 may include Wi-Fi and/or Ethernet connections.

Any of the congested endpoint devices may utilize the optical link and/or other connection paths as specified by the forwarding policy. For example, depending on characteristics of data packets obtained by endpoint device 1, a first portion of the data packets may be forwarded to optical service point 302A via operable connection 311, a second portion of data packets may be forwarded to network switch 300 via direct connection 308, and a third portion of data packets may be forwarded to endpoint device 2 via operable connection 312.

By doing so, available (aggregate) bandwidth for data forwarding may be increased in an effort to ease bottlenecks and/or improve network performance associated with the congested endpoint devices.

Figure 4:
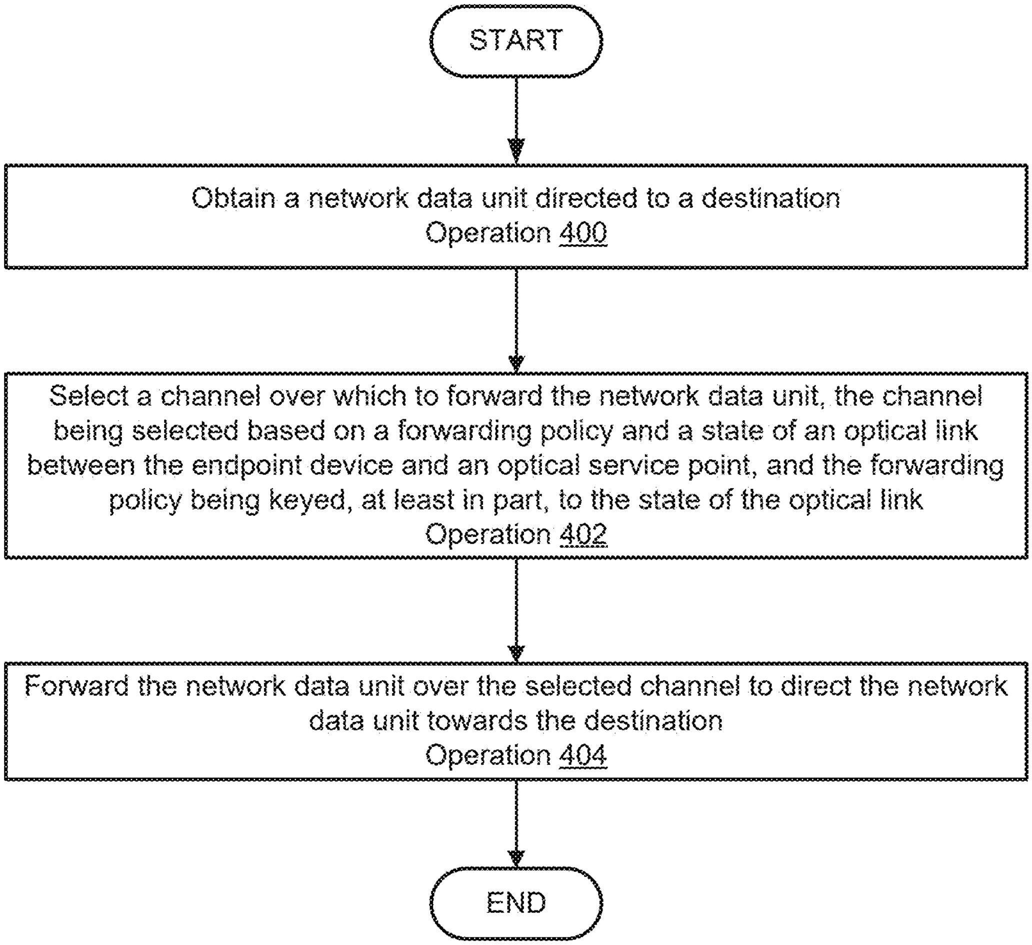
FIG. 4 shows a flow diagram illustrating a method in accordance with an embodiment.

As discussed above, the components of FIG. 1A may perform various methods to manage operation of endpoint devices in view of network congestion. FIG. 4 illustrates a method that may be performed by the components of the system of FIGS. 1A-1B and/or by other components. In the diagram discussed below and shown in FIG. 4, any of the operations may be repeated, performed in different orders, and/or performed in parallel with or in a partially overlapping in time manner with other operations.

Turning to FIG. 4, a flow diagram illustrating a method for managing operation of an endpoint device of a deployment in accordance with an embodiment is shown. The method may be performed by any of the components of the system shown in FIGS. 1A-1B.

Prior to operation 400, network data unit traffic (e.g., network traffic) may be analyzed to obtain a congestion report. The network traffic may be analyzed by performing a network traffic analysis process, using methods described with respect to FIG. 2A and/or by other methods. The congestion report may be obtained, for example, by (i) reading the congestion report from storage, (ii) receiving the congestion report (e.g., from another device), (iii) generating the congestion report, and/or (iv) via other methods. For example, the congestion report may be generated by the endpoint device by collecting network traffic data of the endpoint device, analyzing the network traffic data, and including the analysis results in a data package (e.g., the congestion report for the endpoint device).

The congestion report may be provided to an edge orchestrator for the deployment. The congestion report may be provided using methods described with respect to FIG. 2A and/or by other methods. For example, the congestion report may be provided by the endpoint device to the edge orchestrator via one or more operable connections to the edge orchestrator. Providing the congestion report may facilitate identification of a congestion level of the network data unit traffic in the deployment (e.g., by the edge orchestrator).

At operation 400, a network data unit directed to a destination may be obtained. The network data unit (e.g., a data packet) may be obtained by the endpoint device by (i) reading the network data unit from storage, (ii) receiving the network data unit (e.g., from another endpoint device), (iii) generating the network data unit, and/or (iv) via other methods. For example, the network data unit may be generated by the endpoint device (or another device) by performing processes and/or using other data available to the endpoint device.

At operation 402, a channel over which to forward the network data unit may be selected. The channel may be selected using methods described with respect to FIG. 2B and/or by other methods. For example, the channel may be selected by querying a forwarding policy (as part of performing a data screening process for the network data unit), which may be keyed to a state of an optical link between the endpoint device and an optical service point, and characteristics of the network data unit.

In a first example, prior to obtaining the network data unit (prior to operation 400), an identification that the state of the optical link changed from an inactive state and to an active state after the congestion report is provided to the edge orchestrator may be made. The identification may be made by the endpoint device, for example, by receiving a notification indicating that the optical link is enabled for offloading data from the endpoint device. Prior to the state of the optical link changing to the active state, the forwarding policy may have forbidden use of the optical link for network data unit forwarding purposes.

By enabling use of the optical link for network data unit forwarding purposes, an aggregate bandwidth of the endpoint devices for network data forwarding purposes may be increased by the optical link during a period of time when the optical link is in the active state. The selected channel may reflect an adaptive routing path for the network data units forwarded in the deployment while the optical link is in an active state.

In a second example, prior to obtaining the network data unit (prior to operation 400), the state of the optical link may not have changed. The selected channel may reflect a prescribed routing path for network data units forwarded in the deployment while the optical link is in an inactive state (e.g., via a primary channel of the network that does not rely on operation of the optical link).

At operation 404, the network data unit may be forwarded over the selected channel to direct the network data unit towards the destination to facilitate provisioning of desired computer-implemented services. The network data unit may be forwarded by performing a data forwarding process using methods described with respect to FIG. 2B and/or by other methods. For example, the network data unit may be forwarded by transmitting the network data unit over the selected channel to a device along the prescribed or adaptive routing path (e.g., another endpoint device of the deployment, an uplink gateway).

The forwarded data unit may be used to provide and/or facilitate provision of a portion of the desired computer-implemented services. For example, the forwarded data unit may be consumed by a downstream consumer, and/or provided to (e.g., stored at) a data center for future use.

The method may end following operation 404.

Thus, using the method shown in FIG. 4, embodiments disclosed herein may manage operation of an endpoint device of a deployment in accordance with a (data) forwarding policy. The forwarding policy may specify adaptive routing paths for data forwarding to increase the likelihood of reducing network congestion and therefore provision of the desired computer-implemented services.

Figure 5:
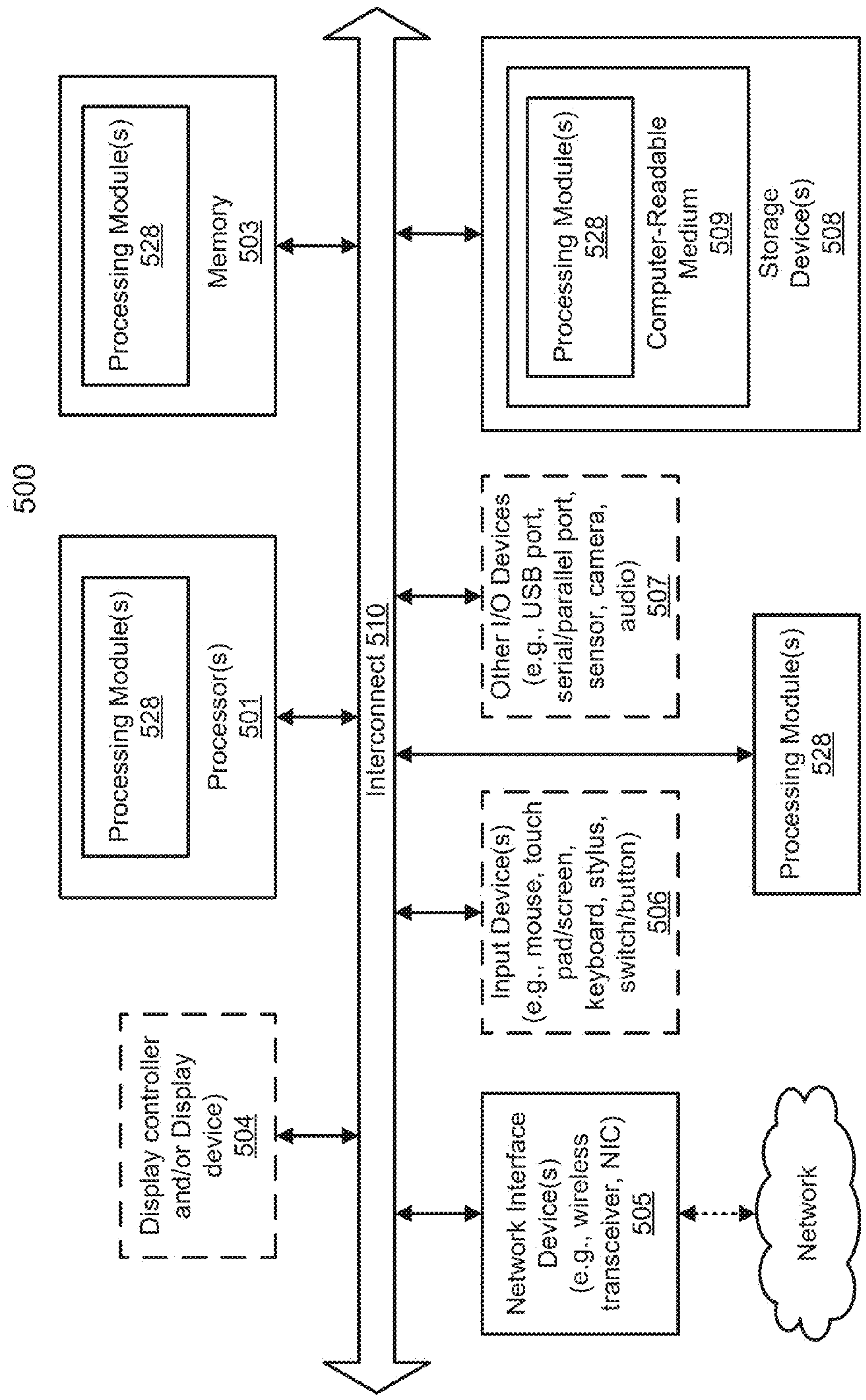
FIG. 5 shows a block diagram illustrating a data processing system in accordance with an embodiment.

Any of the components illustrated in FIGS. 1A-3 may be implemented with one or more computing devices. Turning to FIG. 5, a block diagram illustrating an example of a data processing system (e.g., a computing device) in accordance with an embodiment is shown. For example, system 500 may represent any of data processing systems described above performing any of the processes or methods described above. System 500 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system. Note also that system 500 is intended to show a high-level view of many components of the computer system. However, it is to be understood that additional components may be present in certain implementations and furthermore, different arrangement of the components shown may occur in other implementations. System 500 may represent a desktop, a laptop, a tablet, a server, a mobile phone, a media player, a personal digital assistant (PDA), a personal communicator, a gaming device, a network router or hub, a wireless access point (AP) or repeater, a set-top box, or a combination thereof. Further, while only a single machine or system is illustrated, the term “machine” or “system” shall also be taken to include any collection of machines or systems that individually or jointly execute a set (or multiple sets) of instructions to perform any one or more of the methodologies discussed herein.

In one embodiment, system 500 includes processor 501, memory 503, and devices 505-507 via a bus or an interconnect 510. Processor 501 may represent a single processor or multiple processors with a single processor core or multiple processor cores included therein. Processor 501 may represent one or more general-purpose processors such as a microprocessor, a central processing unit (CPU), or the like. More particularly, processor 501 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 501 may also be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a co-processor, an embedded processor, or any other type of logic capable of processing instructions.

Processor 501, which may be a low power multi-core processor socket such as an ultra-low voltage processor, may act as a main processing unit and central hub for communication with the various components of the system. Such processor can be implemented as a system on chip (SoC). Processor 501 is configured to execute instructions for performing the operations discussed herein. System 500 may further include a graphics interface that communicates with optional graphics subsystem 504, which may include a display controller, a graphics processor, and/or a display device.

Processor 501 may communicate with memory 503, which in one embodiment can be implemented via multiple memory devices to provide for a given amount of system memory. Memory 503 may include one or more volatile storage (or memory) devices such as random-access memory (RAM), dynamic RAM (DRAM), synchronous DRAM (SDRAM), static RAM (SRAM), or other types of storage devices. Memory 503 may store information including sequences of instructions that are executed by processor 501, or any other device. For example, executable code and/or data of a variety of operating systems, device drivers, firmware (e.g., input output basic system or BIOS), and/or applications can be loaded in memory 503 and executed by processor 501. An operating system can be any kind of operating systems, such as, for example, Windows® operating system from Microsoft®, Mac OS®/iOS® from Apple, Android® from Google®, Linux®, Unix®, or other real-time or embedded operating systems such as VxWorks.

System 500 may further include IO devices such as devices (e.g., 505, 506, 507, 508) including network interface device(s) 505, optional input device(s) 506, and other optional IO device(s) 507. Network interface device(s) 505 may include a wireless transceiver and/or a network interface card (NIC). The wireless transceiver may be a Wi-Fi transceiver, an infrared transceiver, a Bluetooth transceiver, a WiMAX transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 506 may include a mouse, a touch pad, a touch sensitive screen (which may be integrated with a display device of optional graphics subsystem 504), a pointer device such as a stylus, and/or a keyboard (e.g., physical keyboard or a virtual keyboard displayed as part of a touch sensitive screen). For example, input device(s) 506 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

IO devices 507 may include an audio device. An audio device may include a speaker and/or a microphone to facilitate voice-enabled functions, such as voice recognition, voice replication, digital recording, and/or telephony functions. Other IO devices 507 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. IO device(s) 507 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 510 via a sensor hub (not shown), while other devices such as a keyboard or thermal sensor may be controlled by an embedded controller (not shown), dependent upon the specific configuration or design of system 500.

To provide for persistent storage of information such as data, applications, one or more operating systems and so forth, a mass storage (not shown) may also couple to processor 501. In various embodiments, to enable a thinner and lighter system design as well as to improve system responsiveness, this mass storage may be implemented via a solid-state device (SSD). However, in other embodiments, the mass storage may primarily be implemented using a hard disk drive (HDD) with a smaller amount of SSD storage to act as an SSD cache to enable non-volatile storage of context state and other such information during power down events so that a fast power up can occur on re-initiation of system activities. Also, a flash device may be coupled to processor 501, e.g., via a serial peripheral interface (SPI). This flash device may provide for non-volatile storage of system software, including a basic input/output software (BIOS) as well as other firmware of the system.

Storage device 508 may include computer-readable storage medium 509 (also known as a machine-readable storage medium or a computer-readable medium) on which is stored one or more sets of instructions or software (e.g., processing module, unit, and/or processing module/unit/logic 528) embodying any one or more of the methodologies or functions described herein. Processing module/unit/logic 528 may represent any of the components described above. Processing module/unit/logic 528 may also reside, completely or at least partially, within memory 503 and/or within processor 501 during execution thereof by system 500, memory 503 and processor 501 also constituting machine-accessible storage media. Processing module/unit/logic 528 may further be transmitted or received over a network via network interface device(s) 505.

Computer-readable storage medium 509 may also be used to store some software functionalities described above persistently. While computer-readable storage medium 509 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of embodiments disclosed herein. The term "computer-readable storage medium" shall accordingly be taken to include, but not be limited to, solid-state memories, and optical and magnetic media, or any other non-transitory machine-readable medium.

Processing module/unit/logic 528, components and other features described herein can be implemented as discrete hardware components or integrated in the functionality of hardware components such as ASICS, FPGAs, DSPs, or similar devices. In addition, processing module/unit/logic 528 can be implemented as firmware or functional circuitry within hardware devices. Further, processing module/unit/logic 528 can be implemented in any combination hardware devices and software components.

Note that while system 500 is illustrated with various components of a data processing system, it is not intended to represent any particular architecture or manner of interconnecting the components; as such details are not germane to embodiments disclosed herein. It will also be appreciated that network computers, handheld computers, mobile phones, servers, and/or other data processing systems which have fewer components, or perhaps more components may also be used with embodiments disclosed herein.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments disclosed herein also relate to an apparatus for performing the operations herein. Such a computer program is stored in a non-transitory computer readable medium. A non-transitory machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g., circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments disclosed herein are not described with reference to any particular programming language. It will be appreciated that a variety of programming languages may be used to implement the teachings of embodiments disclosed herein.

In the foregoing specification, embodiments have been described with reference to specific exemplary embodiments thereof. It will be evident that various modifications may be made thereto without departing from the broader spirit and scope of the embodiments disclosed herein as set forth in the following claims. The specification and drawings are, accordingly, to be regarded in an illustrative sense rather than a restrictive sense.

What is claimed is:

1. A method for managing operation of an endpoint device of a deployment, the method comprising:

obtaining, by the endpoint device, a network data unit directed to a destination;

selecting, by the endpoint device, a channel over which to forward the network data unit, the channel being selected based on a forwarding policy and a state of an optical link between the endpoint device and an optical service point, and the forwarding policy being keyed, at least in part, to the state of the optical link; and forwarding, by the endpoint device, the network data unit over the selected channel to direct the network data unit towards the destination to facilitate provisioning of desired computer-implemented services, wherein the forwarding policy is adapted to establish a prescribed routing path for network data units forwarded in the deployment while the optical link is in an inactive state, and establish an adaptive routing path for the network data units forwarded in the deployment while the optical link is in an active state.

2. The method of claim 1, further comprising:

prior to obtaining the network data unit:

analyzing, by the endpoint device, network data unit traffic to obtain a congestion report; and providing, by the endpoint device, the congestion report to an edge orchestrator for the deployment to facilitate identification of a congestion level of the network data unit traffic in the deployment.

3. The method of claim 2, wherein the congestion report is provided to the edge orchestrator via the optical link or a primary network channel, the primary network channel comprising a radio frequency link.

4. The method of claim 2, further comprising:

prior to obtaining the network data unit:

making an identification that the state of the optical link changed from an inactive state and to an active state after the congestion report is provided to the edge orchestrator.

5. The method of claim 4, wherein the forwarding policy forbade use of the optical link for network data unit forwarding purposes prior to the state of the optical link changing to the active state.

6. The method of claim 5, wherein, after the state of the optical link changes to the active state, the forwarding policy enables use of the optical link for network data unit forwarding purposes, and an aggregate bandwidth of the endpoint device for network data forwarding purposes being increased by the optical link while the optical link is in the active state.

7. The method of claim 1, wherein the forwarding policy is further keyed to:

congestion levels of other endpoint devices of the deployment;

prioritization goals; and network data unit origination location.

8. A non-transitory machine-readable medium having instructions stored therein, which when executed by a processor, cause the processor to perform operations for managing operation of an endpoint device of a deployment, the operations comprising:

obtaining, by the endpoint device, a network data unit directed to a destination;

selecting, by the endpoint device, a channel over which to forward the network data unit, the channel being selected based on a forwarding policy and a state of an optical link between the endpoint device and an optical service point, and the forwarding policy being keyed, at least in part, to the state of the optical link; and forwarding, by the endpoint device, the network data unit over the selected channel to direct the network data unit towards the destination to facilitate provisioning of desired computer-implemented services, wherein the forwarding policy is adapted to establish a prescribed routing path for network data units forwarded in the deployment while the optical link is in an inactive state, and establish an adaptive routing path for the network data units forwarded in the deployment while the optical link is in an active state.

9. The non-transitory machine-readable medium of claim 8, wherein the operations further comprise:

prior to obtaining the network data unit:

analyzing, by the endpoint device, network data unit traffic to obtain a congestion report; and providing, by the endpoint device, the congestion report to an edge orchestrator for the deployment to facilitate identification of a congestion level of the network data unit traffic in the deployment.

10. The non-transitory machine-readable medium of claim 9, wherein the congestion report is provided to the edge orchestrator via the optical link or a primary network channel, the primary network channel comprising a radio frequency link.

11. The non-transitory machine-readable medium of claim 9, wherein the operations further comprise:

prior to obtaining the network data unit:

making an identification that the state of the optical link changed from an inactive state and to an active state after the congestion report is provided to the edge orchestrator.

12. The non-transitory machine-readable medium of claim 11, wherein the forwarding policy forbade use of the optical link for network data unit forwarding purposes prior to the state of the optical link changing to the active state.

13. The non-transitory machine-readable medium of claim 12, wherein, after the state of the optical link changes to the active state, the forwarding policy enables use of the optical link for network data unit forwarding purposes, and an aggregate bandwidth of the endpoint device for network data forwarding purposes being increased by the optical link while the optical link is in the active state.

14. An endpoint device of a deployment, comprising:

a processor; and a memory coupled to the processor to store instructions, which when executed by the processor, cause the endpoint device to perform operations, the operations comprising:

obtaining a network data unit directed to a destination, selecting a channel over which to forward the network data unit, the channel being selected based on a forwarding policy and a state of an optical link between the endpoint device and an optical service point, and the forwarding policy being keyed, at least in part, to the state of the optical link, and forwarding the network data unit over the selected channel to direct the network data unit towards the destination to facilitate provisioning of desired computer-implemented services, wherein the forwarding policy is adapted to establish a prescribed routing path for network data units forwarded in the deployment while the optical link is in an inactive state, and establish an adaptive routing path for the network data units forwarded in the deployment while the optical link is in an active state.

15. The endpoint device of claim 14, wherein the operations further comprise:

prior to obtaining the network data unit:

analyzing network data unit traffic to obtain a congestion report; and providing the congestion report to an edge orchestrator for a deployment to facilitate identification of a congestion level of the network data unit traffic in the deployment.

16. The endpoint device of claim 15, wherein the congestion report is provided to the edge orchestrator via the optical link or a primary network channel, the primary network channel comprising a radio frequency link.

17. The endpoint device of claim 15, wherein the operations further comprise:

prior to obtaining the network data unit:

making an identification that the state of the optical link changed from an inactive state and to an active state after the congestion report is provided to the edge orchestrator.

18. The endpoint device of claim 17, wherein the forwarding policy forbade use of the optical link for network data unit forwarding purposes prior to the state of the optical link changing to the active state.

19. The endpoint device of claim 18, wherein, after the state of the optical link changes to the active state, the forwarding policy enables use of the optical link for network data unit forwarding purposes, and an aggregate bandwidth of the endpoint device for network data forwarding purposes being increased by the optical link while the optical link is in the active state.

20. The endpoint device of claim 14, wherein the forwarding policy is further keyed to:

congestion levels of other endpoint devices of the deployment;

prioritization goals; and network data unit origination location.

* * * * *